US009161337B2

(12) United States Patent
Terry

(10) Patent No.: US 9,161,337 B2
(45) Date of Patent: *Oct. 13, 2015

(54) METHOD AND APPARATUS FOR DYNAMICALLY ALLOCATING H-ARQ PROCESSES

(71) Applicant: InterDigital Technology Corporation, Wilmington, DE (US)

(72) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/913,878

(22) Filed: Jun. 10, 2013

(65) Prior Publication Data
US 2013/0272243 A1 Oct. 17, 2013

Related U.S. Application Data

(63) Continuation of application No. 12/772,543, filed on May 3, 2010, now Pat. No. 8,462,717, which is a continuation of application No. 11/139,880, filed on May 27, 2005, now Pat. No. 7,710,911.

(60) Provisional application No. 60/578,712, filed on Jun. 10, 2004.

(51) Int. Cl.
*H04W 4/00* (2009.01)
*H04W 72/04* (2009.01)
(Continued)

(52) U.S. Cl.
CPC .............. *H04W 72/04* (2013.01); *H04L 1/1812* (2013.01); *H04L 1/1887* (2013.01); *H04W 28/04* (2013.01); *H04W 74/00* (2013.01); *H04W 88/12* (2013.01)

(58) Field of Classification Search
CPC ..... H04W 80/04; H04W 28/04; H04W 28/06; H04W 24/00
USPC ......................... 370/328, 329, 349; 455/452.1
See application file for complete search history.

(56) References Cited

U.S. PATENT DOCUMENTS 6,307,867 B1 10/2001 Roobol et al.
6,704,898 B1 3/2004 Furuskar et al.
(Continued)

FOREIGN PATENT DOCUMENTS

EP 1335541 8/2003
EP 1389847 2/2004
(Continued)

OTHER PUBLICATIONS

Frederiksen et al., "Performance and Modeling of WCDMA/HSDPA Transmission/H-ARQ Schemes," Proceedings of the IEEE 56th Vehicular Technology Conference, vol. 1, pp. 472-476 (2002).
(Continued)

*Primary Examiner* — Danh Le
(74) *Attorney, Agent, or Firm* — Volpe and Koenig, P.C.

(57) ABSTRACT

A method and wireless transmit/receive unit (WTRU) for supporting enhanced uplink (EU) transmissions are disclosed. A WTRU is configured to provide hybrid automatic repeat request (H-ARQ) processes for supporting transmission over an enhanced uplink (EU) channel, to receive configuration information, wherein the configuration information indicates which H-ARQ processes are associated with a particular MAC-d flow, to allocate an H-ARQ process for transmission of data from the MAC-d flow, wherein the allocated H-ARQ process is from one of the associated H-ARQ processes, and to transmit data from the MAC-d flow over the EU channel using the allocated H-ARQ process.

12 Claims, 4 Drawing Sheets

(51) Int. Cl.
*H04L 1/18* (2006.01)
*H04W 28/04* (2009.01)
*H04W 74/00* (2009.01)
*H04W 88/12* (2009.01)

(56) References Cited

U.S. PATENT DOCUMENTS

| | | | |
|---|---|---|---|
| 6,842,445 B2 | 1/2005 | Ahmavaara et al. | |
| 7,301,988 B2 | 11/2007 | Kanterakis | |
| 7,356,005 B2 | 4/2008 | Derryberry et al. | |
| 7,376,879 B2 | 5/2008 | Terry et al. | |
| 7,471,693 B2 | 12/2008 | Petrovic et al. | |
| 7,484,000 B2 | 1/2009 | Jiang | |
| 7,515,616 B2 | 4/2009 | Yi et al. | |
| 7,631,247 B2 | 12/2009 | Petrovic et al. | |
| 2002/0093937 A1 | 7/2002 | Kim et al. | |
| 2003/0039270 A1 | 2/2003 | Chang et al. | |
| 2003/0043839 A1* | 3/2003 | Luschi et al. | 370/445 |
| 2003/0086391 A1* | 5/2003 | Terry et al. | 370/329 |
| 2003/0101274 A1 | 5/2003 | Yi et al. | |
| 2003/0112802 A1 | 6/2003 | Ono et al. | |
| 2003/0123470 A1 | 7/2003 | Kim et al. | |
| 2003/0131124 A1 | 7/2003 | Yi et al. | |
| 2003/0135632 A1 | 7/2003 | Vrzic et al. | |
| 2003/0147371 A1 | 8/2003 | Choi et al. | |
| 2003/0210669 A1 | 11/2003 | Vayanos et al. | |
| 2003/0235162 A1* | 12/2003 | Chao et al. | 370/329 |
| 2004/0009767 A1 | 1/2004 | Lee et al. | |
| 2004/0009786 A1* | 1/2004 | Terry | 455/522 |
| 2004/0160925 A1 | 8/2004 | Heo et al. | |
| 2004/0160959 A1* | 8/2004 | Balachandran et al. | 370/395.4 |
| 2004/0196799 A1 | 10/2004 | Terry | |
| 2004/0213259 A1 | 10/2004 | Porter | |
| 2004/0228313 A1 | 11/2004 | Cheng et al. | |
| 2004/0258070 A1 | 12/2004 | Arima | |
| 2005/0022098 A1 | 1/2005 | Vayanos et al. | |
| 2005/0076283 A1 | 4/2005 | Malkamaki et al. | |
| 2005/0207359 A1 | 9/2005 | Hwang et al. | |
| 2005/0249120 A1 | 11/2005 | Heo et al. | |
| 2005/0250454 A1 | 11/2005 | Sebire et al. | |

FOREIGN PATENT DOCUMENTS

| | | |
|---|---|---|
| EP | 1389848 | 2/2004 |
| EP | 1530384 | 5/2005 |
| GB | 2361392 A1 | 10/2001 |
| WO | 02/087131 | 10/2002 |
| WO | 03/019844 | 3/2003 |
| WO | 03/036844 | 5/2003 |
| WO | 2004/019543 | 3/2004 |
| WO | 2004/030267 | 4/2004 |
| WO | 2004/042954 | 5/2004 |

OTHER PUBLICATIONS

Ghosh et al, "Overview of Enhanced Uplink for 3GPP W-CDMA," Proceedings of the 59th IEEE Vehicular Technology Conference, vol. 4 (May 17-19, 2004).

Panasonic, "HSUPA MAC architecture," 3GPP TSG-RAN WG2 Meeting #42, R2-040973 (May 10-14, 2004).

3GPP, "3$^{rd}$ Generation Partnership Project; Technical Specification Group Radio Access Network; FDD Enhanced Uplink; Overall Description; Stage 2 (Release 6)," 3GPP TS 25.309 V6.2.0, (Mar. 2005).

3GPP, "3$^{rd}$ Generation Partnership Project; Technical Specification Group Radio Access Network; Radio Resource Control (RRC) Protcol Specification (Release 1999)," 3GPP TS 25.331 V3.18.0, (Mar. 2004).

3GPP, "3$^{rd}$ Generation Partnership Project; Technical Specification Group Radio Access Network; Radio Resource Control (RRC) Protocol Specification (Release 1999)," 3GPP TS 25.331 V3.21.0, (Dec. 2004).

3GPP, "3$^{rd}$ Generation Partnership Project; Technical Specification Group Radio Access Network; Radio Resource Control (RRC) Protocol Specification (Release 4)," 3GPP TS 25.331 V4.13.0, (Mar. 2004).

3GPP, "3$^{rd}$ Generation Partnership Project; Technical Specification Group Radio Access Network; Radio Resource Control (RRC) Protocol Specification (Release 4)," 3GPP TS 25.331 V4.17.0, (Mar. 2005).

3GPP, "3$^{rd}$ Generation Partnership Project; Technical Specification Group Radio Access Network; Radio Resource Control (RRC) Protocol Specification (Release 5)," 3GPP TS 25.331 V5.8.0, (Mar. 2004).

3GPP, "3$^{rd}$ Generation Partnership Project; Technical Specification Group Radio Access Network; Radio Resource Control (RRC) Protocol Specification (Release 5)," 3GPP TS 25.331 V5.12.1, (Mar. 2005).

3GPP, "3$^{rd}$ Generation Partnership Project; Technical Specification Group Radio Access Network; Radio Resource Control (RRC) Protocol Specification (Release 6)," 3GPP TS 25.311 V6.1.0, (Mar. 2004).

3GPP, "3$^{rd}$ Generation Partnership Project; Technical Specification Group Radio Access Network; Radio Resource Control (RRC) Protocol Specification (Release 6)," 3GPP TS 25.311 V6.5.0, (Mar. 2005).

3GPP, "3$^{rd}$ Generation Partnership Project; Technical Specification Group Radio Access Network; Medium Access Control (MAC) protocol specification (Release 6)," 3GPP TS 25.321 V6.4.0 (Mar. 2005).

3GPP, "3$^{rd}$ Generation Partnership Project; Technical Specification Group Radio Access Network; Medium Access Control (MAC) protocol specification (Release 6)," 3GPP TS 25.321 V6.1.0 (Mar. 2004).

3GPP, "3$^{rd}$ Generation Partnership Project; Technical Specification Group Radio Access Network; Medium Access Control (MAC) protocol specification (Release 4)," 3GPP TS 23.321 V4.10.0 (Jun. 2004).

3GPP, "3$^{rd}$ Generation Partnership Project; Technical Specification Group Radio Access Network; Medium Access Control (MAC) protocol specification (Release 5)," 3GPP TS 25.321 V5.8.0 (Mar. 2004).

3GPP, "3$^{rd}$ Generation Partnership Project; Technical Specification Group Radio Access Network; Medium Access Control (MAC) protocol specification (Release 5)," 3GPP TS 25.321 V5.10.0 (Dec. 2004).

3GPP, "3$^{rd}$ Generation Partnership Project; Technical Specification Group Radio Access Network; Medium Access Control (MAC) protocol specification (Release 4)," 3GPP TS 25.321 V4.9.0 (Sep. 2003).

3GPP, "3$^{rd}$ Generation Partnership Project; Technical Specification Group Radio Access Network; Medium Access Control (MAC) protocol specification (Release 1999)," 3GPP TS 25.321 V3.17.0 (Jun. 2004).

3GPP, "3$^{rd}$ Generation Partnership Project; Technical Specification Group Radio Access Network; Medium Access Control (MAC) protocol specification (Release 1999)," 3GPP TS 25.321 V3.16.0 (Sep. 2003).

3GPP2 C.S0003-C, "Medium Access Control (MAC) Standard for cdma2000 Spread Spectrum Systems", 3$^{rd}$ Generation Partnership Project 2 "3GPP2", Version 2.0, Release C, Aug. 2004.

3GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.

3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.

Ofuji et al., "Unified Packet Scheduling Method Considering Delay Requirement in Forward Link Broadband Wireless Access," IEEE 58$^{th}$ Vehicular Technology Conference, vol. 3, pp. 1603-1607 (Oct. 6-9, 2003).

Yang, "Progressing of TD-SCDMA Standard," Communication World (Sep. 8, 2003).

(56) References Cited

OTHER PUBLICATIONS

Ericsson, "E-DCH multiplexing and transport channel structure," TSG-RAN Working Group 2 meeting #42, R2-040917 Montreal, Canada (May 10-14, 2004).

Ericsson, "Text proposal: E-DCH Transport Channel Structure," TSG-RAN WG1 #34, R1-030997, Seoul, Korea (Oct. 6-10, 2003).

Infineon, "Overview of E-DCH MAC Architecture," 3GPP TSG-RAN WG2 Meeting #42, R2-040958, Montreal, Canada (May 10-14, 2004).

* cited by examiner

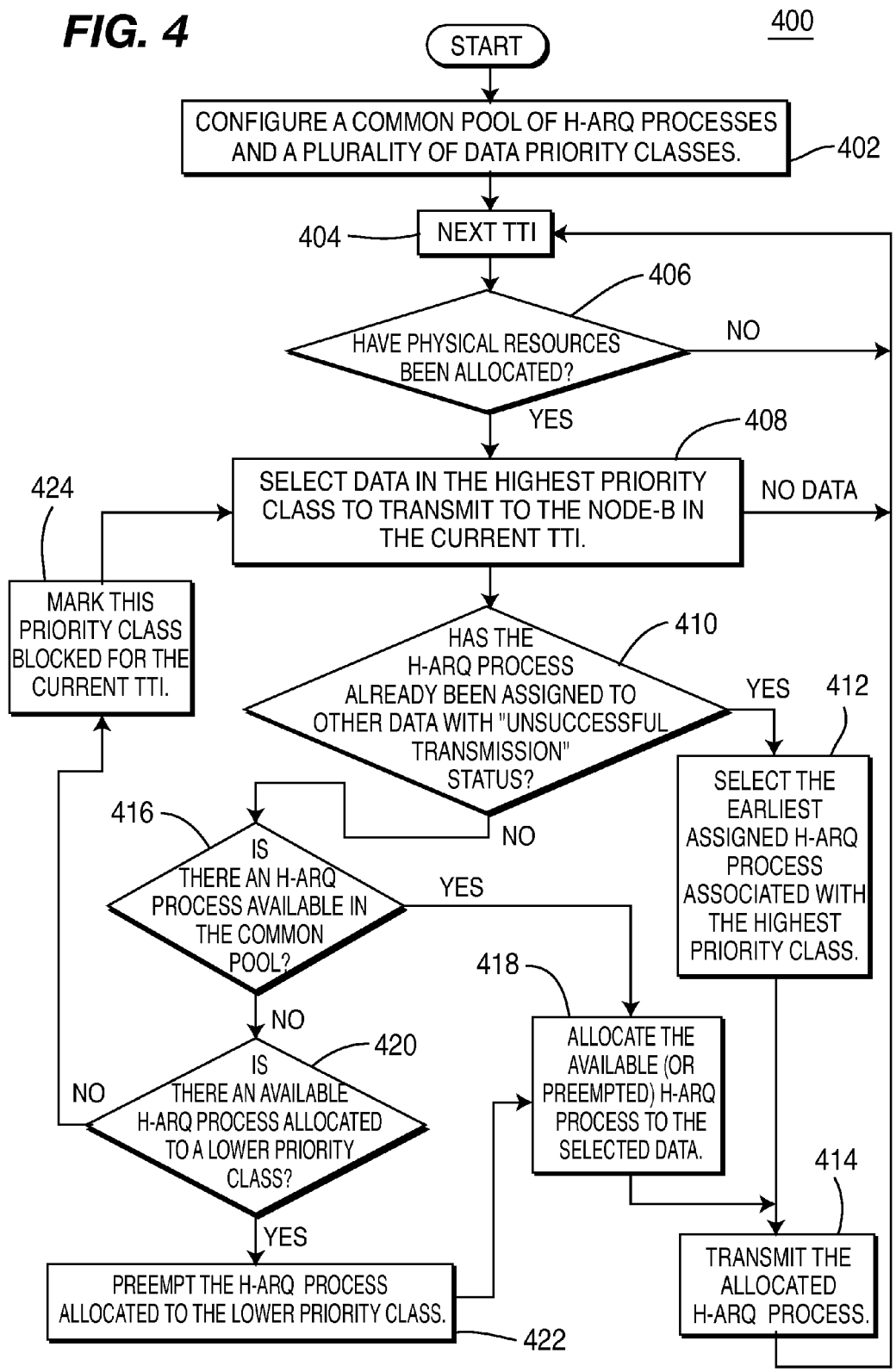

METHOD AND APPARATUS FOR DYNAMICALLY ALLOCATING H-ARQ PROCESSES

CROSS REFERENCE TO RELATED APPLICATION

This application is a continuation of U.S. patent application Ser. No. 12/772,543 filed May 3, 2010, which is a continuation of U.S. patent application Ser. No. 11/139,880 filed May 27, 2005, which issued as U.S. Pat. No. 7,710,911 on May 4, 2010, which claims the benefit of U.S. Provisional Application Ser. No. 60/578,712 filed Jun. 10, 2004, the contents of which are incorporated by reference as if fully set forth.

FIELD OF INVENTION

The present invention is related to a hybrid-automatic repeat request (H-ARQ) operation in a wireless communication system including at least one wireless transmit/receive unit (WTRU), at least one Node-B and a radio network controller (RNC). More particularly, the present invention is a method and system for dynamically allocating H-ARQ processes in the WTRU for supporting enhanced uplink (EU) transmissions.

BACKGROUND

An EU operation reduces uplink (UL) latency, improves throughput, and provides more efficient use of physical radio resources. During EU operation, an H-ARQ process is used to support EU transmissions between a WTRU and a Node-B including the facilitation of a feedback process for reporting successful or unsuccessful EU data transmissions.

A number of EU H-ARQ processes are defined for each WTRU, and each WTRU supports multiple instances of H-ARQ processes simultaneously. Since a feedback cycle for each EU data transmission is relatively long when compared to UL transmission time, and a different number of transmissions may be required to achieve a successful transmission for each EU transmission, a WTRU is required to operate several H-ARQ processes simultaneously to provide increased data rates and reduced latency.

For any WTRU connection, multiple logical channels exist. These logical channels have different throughput, latency, error rates, and quality of service (QoS) requirements. To satisfy these requirements, the RNC sets a priority for each logical channel known as a medium access control (MAC) logical channel priority (MLP). The MLP is mapped to a dedicated channel MAC (MAC-d) flow which is connected to the EU MAC (MAC-e), which manages the EU H-ARQ processes.

A similar design exists for high speed downlink packet access (HSDPA) in a downlink (DL) channel. When higher priority data is required to be transmitted and all H-ARQ processes are already assigned for transmission of lower priority data, it is allowed to preempt the existing H-ARQ transmissions of lower priority with a higher priority transmission. When the preemption occurs, the lower priority data is rescheduled for an H-ARQ transmission at a later time.

A problem with H-ARQ process preemption is a loss of the benefit of combining. One important advantage of an EU H-ARQ operation is the ability to store received data from previous transmissions and to combine the previous transmissions with subsequent transmissions to increase the probability of a successful data transmission. However, when the H-ARQ processes are preempted, the stored data of the previous transmissions, and thus, the combining advantage of the H-ARQ processes is lost.

A reason for implementing H-ARQ process preemption is that the number of H-ARQ processes that can be configured in the WTRU is limited. While each H-ARQ process requires considerable memory for reception processing, the amount of memory in the WTRU is limited.

Because it is common to have a large amount of lower priority data and a small amount of higher priority data, when processing lower priority transmissions, it is necessary to avoid blocking of higher priority transmissions in order to maintain QoS requirements of the higher priority data. If lower priority data monopolizes the H-ARQ processes, it may degrade overall system performance. Moreover, since lower priority data allows greater latency, it can result in greater H-ARQ process holding time.

H-ARQ process preemption may solve the transmission prioritization problem, but at the expense of the loss of the combining benefit and, correspondingly, the less efficient use of radio resources. It is expected that the best overall performance is achieved in H-ARQ systems when a large percentage of the first and possibly second transmissions fail because a less robust modulation and coding scheme (MCS) requiring far less physical resources can be applied. In this case, when H-ARQ process preemption is employed, these initial transmissions and retransmissions will frequently have to be repeated to achieve successful transmission, which wastes radio resources utilized for the initial preempted transmissions.

SUMMARY

The present invention is a method and apparatus for dynamically allocating H-ARQ processes in the WTRU for supporting EU transmissions. The H-ARQ processes in the WTRU are reserved for specific transport channels (TrCHs), dedicated channel medium access control (MAC-d) flows or logical channels associated with different data transmission priority classes. The WTRU allocates H-ARQ processes from those reserved H-ARQ processes that are available. Optionally, a higher priority channel may be allowed to allocate an H-ARQ process reserved for lower priority channels. Lower priority H-ARQ processes may be preempted. The preemption may be restricted by urgency of data transmission, (for example, close to expiration of lifespan timer), or by RNC configuration of H-ARQ processes. Alternatively, a common pool of H-ARQ processes may be configured and an H-ARQ process may be allocated from the common pool in accordance with a priority of each channel, and lower priority H-ARQ may be preempted.

In accordance with the present invention, lower priority data may achieve maximum data rates, and higher priority transmissions may be initiated at any time without requiring the need for H-ARQ process preemption. By reserving H-ARQ processes for specific channels and allowing the WTRU to dynamically allocate these H-ARQ processes, the EU data rate and transmission latency for these channels can be better guaranteed to meet their QoS requirements.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 4 is a flow diagram of a process for allocating H-ARQ processes of the system of FIG. 1 in accordance with a third embodiment of the present invention.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
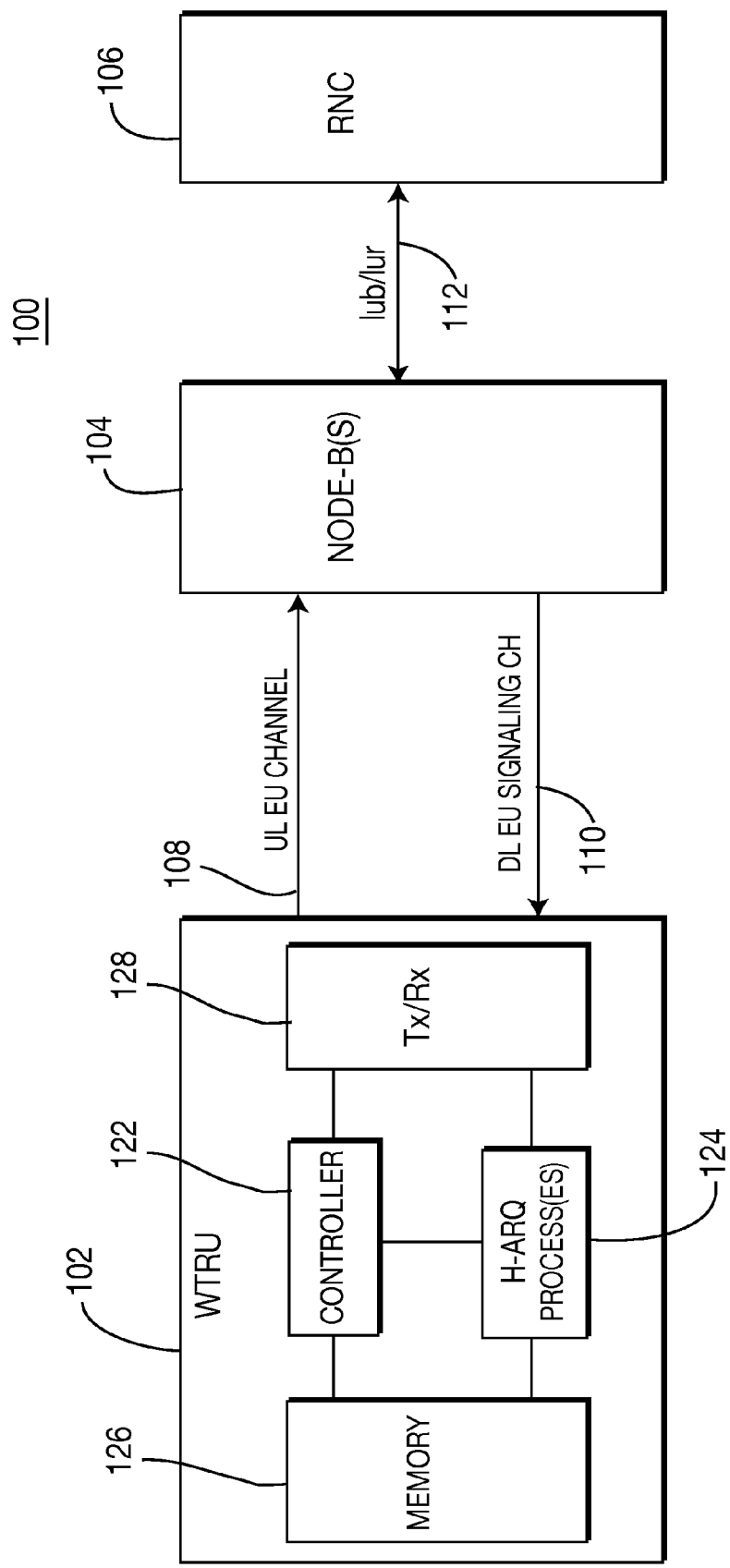
FIG. 1 is a block diagram of a wireless communication system in accordance with the present invention.

FIG. 1 is a block diagram of a wireless communication system 100 operating in accordance with the present invention. The system 100 includes at least one WTRU 102, at least one Node-B 104 and an RNC 106. The RNC 106 controls overall EU operation via an Iub/Iur 112 by configuring EU parameters for the Node-B 104 and the WTRU 102, such as configuration of H-ARQ processes 124 in the WTRU 102, initial transmit power level, maximum allowed EU transmit power or available physical resources. An UL EU channel 108 is established between the WTRU 102 and the Node-B 104 for facilitating EU transmissions. The UL EU channel 108 includes an enhanced dedicated channel (E-DCH) for transmission of E-DCH data and may also include a separate UL EU signaling channel. The UL EU signaling may also be transmitted via the E-DCH.

The WTRU 102 includes a controller 122, a plurality of H-ARQ processes 124, a memory 126 and a transmitter/receiver 128. The controller 122 controls overall procedures of H-ARQ assignment and E-DCH transmissions. Furthermore, the controller 122 keeps track of the status of each transmission associated with an H-ARQ process. The memory 126 stores E-DCH data for transmission. The H-ARQ processes 124 and the memory 126 may be partitioned to support a plurality of priority classes which will be explained in further detail hereinafter.

For E-DCH transmissions, the WTRU 102 sends a channel allocation request to the Node-B 104 via the UL EU channel 108. In response, the Node-B 104 sends channel allocation information to the WTRU 102 via a DL EU signaling channel 110. After EU physical resources are allocated for the WTRU 102, the WTRU 102 transmits E-DCH data via the UL EU channel 108. In response to the E-DCH transmissions, the Node-B sends an acknowledge (ACK) or non-acknowledge (NACK) message for H-ARQ operation via the DL EU signaling channel 110.

The memory requirement for H-ARQ operation is primarily a problem for the receiver. For HSDPA, the number of H-ARQ processes and the memory reserved for each H-ARQ process is minimized. For EU, the memory requirement in the WTRU is not as restricted as is the case for HSDPA. It is a maximum data rate that limits the minimization of the H-ARQ processes and the memory requirements. For each "stop and wait" H-ARQ process transmission, there is a cycle of generating the transmission and waiting for and processing feedback for that transmission. In order to have the ability for continuous transmission, several H-ARQ processes are required to operate in sequence.

Since the memory requirement of the WTRU 102 is not as much of a concern in EU, the number of H-ARQ processes 124 and the memory 126 reserved for each priority class may exceed the number of H-ARQ processes required to achieve particular data rates for each priority class. The WTRU 102 can be configured for more H-ARQ processes than that can be used at one time. In accordance with one embodiment, the H-ARQ processes are reserved for specific TrCHs, MAC-d flows or logical channels which can be dynamically allocated by the WTRU 102 at any time so that preemption of an already assigned H-ARQ process and the corresponding loss of the combining benefit can be avoided.

The H-ARQ operation may be either synchronous or asynchronous between the WTRU 102 and the Node-B 104. In an asynchronous H-ARQ operation, the mechanism for selecting H-ARQ processes at the WTRU 102 are not known to the Node-B 104, therefore, the H-ARQ process should be identified in each transmission. In a synchronous H-ARQ operation, the mechanism for selecting H-ARQ processes at the WTRU 102 are predetermined and known to the Node-B 104. The Node-B 104 may identify the H-ARQ process used at the WTRU 102 based on the predetermined transmission schedule. Each E-DCH transmission includes a new data indicator (NDI) indicating that the transmission is either a "new transmission" or a "retransmission." The initial value of the NDI indicates that the transmission is a "new transmission." A retransmission sequence number of each H-ARQ transmission provides similar information. In a synchronous H-ARQ operation, the Node-B 104 can determine which H-ARQ process was used at the WTRU 102 and what transmissions should be combined with what previous transmissions based on when the transmission is sent.

Figure 2:
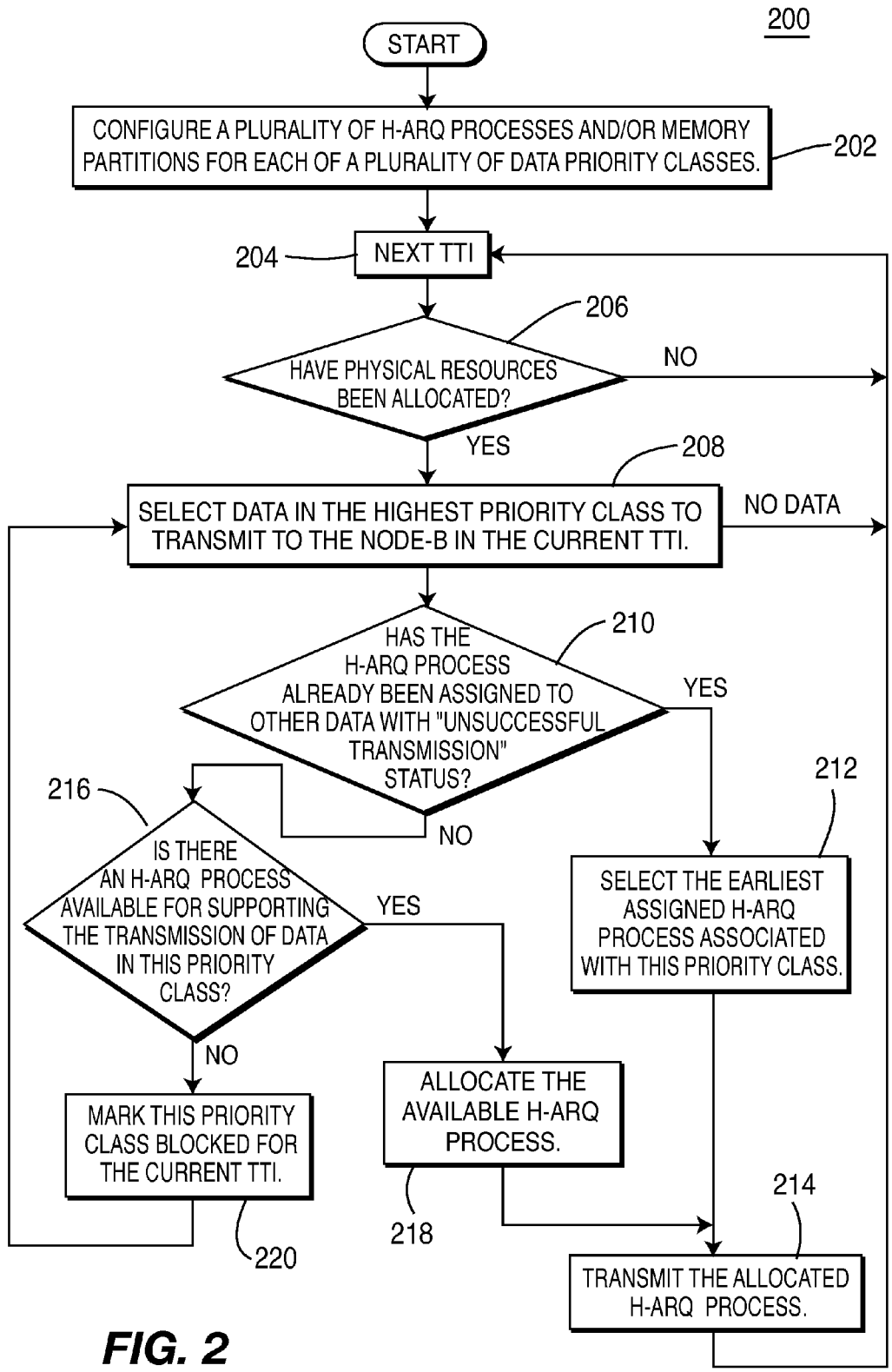
FIG. 2 is a flow diagram of a process for allocating H-ARQ processes of the system of FIG. 1 in accordance with a first embodiment of the present invention.

FIG. 2 is a flow diagram of a process 200 for allocating H-ARQ processes 124 in the WTRU 102 in accordance with a first embodiment of the present invention. The RNC 106 configures the WTRU 102, such as the number of H-ARQ processes 124 and/or memory partitioning associated with each logical channel, MAC-d flow, transport channel (TrCH) or data priority class are configured (step 202). This is preferably performed through layer-3 radio resource control (RRC) signaling procedures.

For each transmit time interval (TTI), at step 204, the WTRU 102 may dynamically allocate an H-ARQ process associated with the TrCH, MAC-d flow or logical channel being serviced. The WTRU 102 determines whether physical resources have been allocated by the Node-B 104 (step 206). If physical resources have not been allocated, the process 200 returns to step 204 to wait for the next TTI. If physical resources have been allocated, the WTRU 102 selects data in the highest priority class to transmit in the current TTI (step 208). The WTRU 102 determines what data to transmit using a selected H-ARQ process 124, preferably based on absolute priority. In such case, the data in the highest priority takes precedence over data in a lower priority class each time a new H-ARQ process is assigned.

If there is no data waiting for transmission, the process 200 returns to step 204 to wait for the next TTI. If there is data to be transmitted and data in the highest priority class is selected in step 208, the WTRU 102 determines whether an H-ARQ process 124 has already been assigned to other data having an "unsuccessful transmission" status (step 210). If an H-ARQ process 124 has been allocated to other data that has not been successfully transmitted, (i.e., feedback information including a NACK message has been received), and is not waiting for data feedback information, the earliest assigned H-ARQ process associated with this priority class is selected at step 212 and the H-ARQ process is transmitted in the current TTI (step 214). The earliest assigned H-ARQ process may be determined by either the lowest transmission sequence number (TSN) or the highest number of retransmissions compared to other H-ARQ processes assigned in the same priority data.

If there is currently no H-ARQ process assigned to other data having an "unsuccessful transmission" status, the WTRU 102 determines whether there is an H-ARQ process associated with the TrCH, MAC-d flow or logical channel, available for supporting the transmission of data in this priority class (step 216). If there is an available H-ARQ process, the WTRU 102 allocates one of the reserved H-ARQ processes 124 associated with the priority class of the selected data (step 218). The priority class may be mapped to configured H-ARQ processes associated with at least one of a logical channel, a MAC-d flow and a TrCH. If there is no available H-ARQ process for the TrCH, MAC-d flow or logical channel of the selected data, the priority class is marked as being blocked for the current TTI (step 220). The process 200 then returns to step 208 to select the next highest priority data. The H-ARQ processes associated with the TrCHs, MAC-d flows or logical channels supporting lower priority classes wait for a TTI where physical resources are allocated and all outstanding ready-to-transmit higher priority H-ARQ processes have been serviced.

It is required to limit the number of H-ARQ processes required to achieve maximum data rates for each logical channel, MAC-d flow or TrCH. The RNC 106 can limit the maximum number of H-ARQ processes reserved for at least one of a logical channel, a MAC-d flow and a TrCH. This effectively limits the maximum data rate of each logical channel, MAC-d flow or TrCH, when lower priority H-ARQ processes are already assigned. High priority data may have a limited number of H-ARQ processes that limits the maximum data rate, but still provides for low transmission latency. For example, signaling radio bearers (SRBs) require low latency, but not high data rates of traffic channels. The SRB TrCH, MAC-d flow, or logical channel may then be configured by the RNC with RRC procedures for a higher priority and one or more H-ARQ processes dedicated for this channel.

Figure 3:
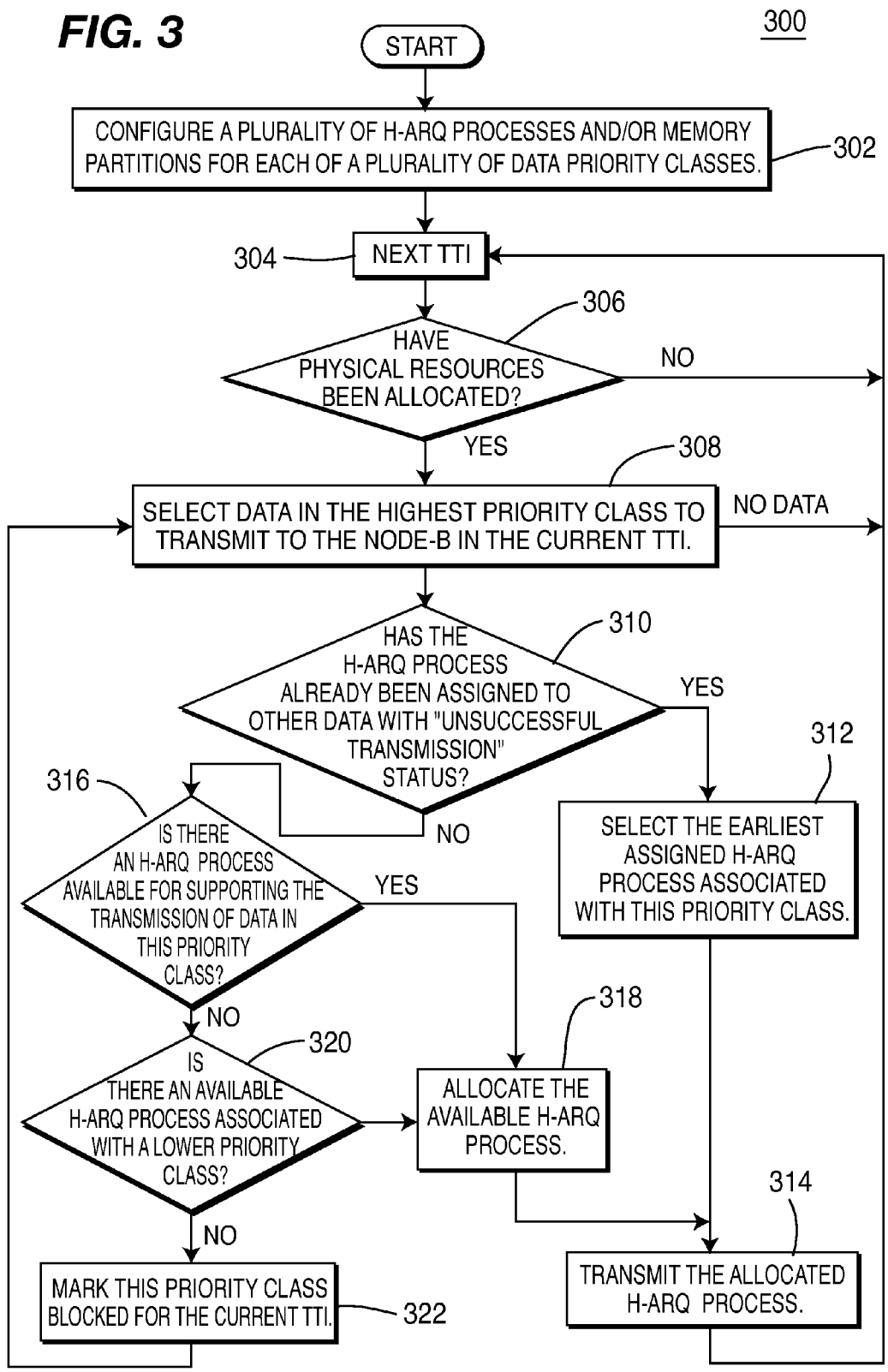
FIG. 3 is a flow diagram of a process for allocating H-ARQ processes of the system of FIG. 1 in accordance with a second embodiment of the present invention.

FIG. 3 is a flow diagram of a process 300 for allocating H-ARQ processes in the WTRU 102 in accordance with a second embodiment of the present invention. The RNC 106 configures the WTRU 102. For example, the number of H-ARQ processes and/or memory partitioning associated with each logical channel, MAC-d flow, TrCH or data priority class is configured (step 302). This is preferably performed through RRC procedures.

For each TTI at step 304, the WTRU 102 dynamically allocates H-ARQ processes. The WTRU 102 determines whether physical resources have been allocated by the Node-B 104 (step 306). If physical resources have not been allocated, the process 300 returns to step 304 to wait for the next TTI. If physical resources have been allocated, the WTRU 102 determines the highest priority data to transmit in the current TTI (step 308) each time a new H-ARQ process is assigned.

If there is no data waiting for transmission, the process 300 returns to step 304 for the next TTI. If there is data to be transmitted, the WTRU 102 determines whether an H-ARQ process has already been assigned to other highest priority data having an "unsuccessful transmission" status (step 310). If an H-ARQ process has been allocated to other highest priority active data that has not been successfully transmitted, (i.e., status of NACK feedback received) and is not waiting for data feedback information, the earliest assigned H-ARQ process associated with the priority class is selected at step 312 and the H-ARQ process is transmitted in the current TTI (step 314).

If there are no currently assigned H-ARQ processes for the highest priority data, the WTRU 102 determines whether there is an H-ARQ process available associated with a TrCH, MAC-d flow or logical channel for this priority class (step 316). If there is an available H-ARQ process for the priority class of the selected data, the WTRU 102 allocates one of the reserved H-ARQ processes for this priority class (step 318), and the H-ARQ process is transmitted at step 314.

If there are no available H-ARQ processes for the priority class of the selected data, the WTRU 102 determines whether there are available H-ARQ processes for lower priority class (step 320). If there are available H-ARQ processes associated with a lower priority class, the process 300 branches to step 318 to allocate the H-ARQ process associated with the lower priority class, and the allocated H-ARQ process is transmitted (step 314). If, at step 320, it is determined that there are no available H-ARQ processes associated with a lower priority class, this priority class is blocked for the current TTI (step 322), and the process 300 returns to step 308 to select the next highest priority data.

Optionally, the H-ARQ processes allocated for lower priority classes may be preempted if there is no available H-ARQ process associated with a lower priority class. The RNC 106 configures the number of H-ARQ processes reserved for each priority class. If a large number of H-ARQ processes are reserved for higher priority data, there would be less preemption. If fewer H-ARQ processes are reserved for higher priority data, then there would be more preemption.

FIG. 4 is a flow diagram of a process 400 for allocating H-ARQ processes of the WTRU 102 in accordance with a third embodiment of the present invention. The RNC 106 configures a common pool of H-ARQ processes, the number of which exceeds the maximum number of H-ARQ processes that can be used at any time by the WTRU 102 (step 402).

For each TTI at step 404, the WTRU 102 dynamically allocates H-ARQ processes. The WTRU 102 determines whether physical resources have been allocated by the Node-B 104 (step 406). If physical resources have not been allocated, the process 400 returns to step 404 to wait for the next TTI. If physical resources have been allocated, the WTRU 102 selects data in the highest priority class to transmit in the current TTI (step 408).

If there is no data waiting for transmission, the process 400 returns to step 404 to wait for the next TTI. If there is data to be transmitted and the highest priority data is selected, the WTRU 102 determines whether an H-ARQ process has already been assigned to other highest priority data having an "unsuccessful transmission" status (step 410). If an H-ARQ process has been allocated to other highest priority active data that has not been successfully transmitted, (i.e., status of NACK feedback received), and is not waiting for data feedback information, the earliest assigned H-ARQ process associated with the priority class is selected at step 412 and the H-ARQ process is transmitted in the current TTI (step 414).

If there are no currently assigned H-ARQ processes for other highest priority data, the WTRU 102 determines whether there is an available H-ARQ process (step 416). If there is an available H-ARQ process, the WTRU 102 allocates the available H-ARQ process (step 418), and the allocated H-ARQ process is transmitted at step 414.

If, at step 416, it is determined that there is no available H-ARQ process, the WTRU 102 determines whether there is an H-ARQ process already allocated for a lower priority class data (step 420). If there is an H-ARQ process already allocated for a lower priority class data, the H-ARQ process allocated for the lowest priority class data is preempted (step 422). The preempted H-ARQ process is allocated for the selected data and the allocated H-ARQ process is transmitted (steps 418, 414). If there is no H-ARQ process already allocated for a lower priority class data, this priority class is blocked for the current TTI (step 424), and the process 400 returns to step 408 to select the next highest priority data.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for supporting enhanced uplink (EU) transmissions implemented by a wireless transmit/receive unit (WTRU), the method comprising:
    providing hybrid automatic repeat request (H-ARQ) processes for supporting transmission over an EU channel;
    receiving configuration information, wherein the configuration information indicates which H-ARQ processes are associated with a particular dedicated channel medium access control (MAC-d) flow, wherein the association indicates that data from the particular MAC-d flow is allowed to be transmitted using an associated H-ARQ process;
    for a transmission time interval (TTI), providing data from the MAC-d flow for transmission using a first H-ARQ process, on a condition that the first H-ARQ process is from one of the associated H-ARQ processes; and
    transmitting data from the MAC-d flow over the EU channel using the first H-ARQ process.

2. The method of claim 1 wherein configuration information is received for each MAC-d flow configured for the WTRU.

3. The method of claim 1 wherein the configuration information is received via radio resource control (RRC) signaling.

4. The method of claim 1 wherein the configuration information is received from a radio network controller (RNC).

5. The method of claim 1 wherein the configuration information limits the H-ARQ processes associated with a MAC-d flow.

6. The method of claim 1 wherein H-ARQ operation is synchronous between the WTRU and a Node-B.

7. A wireless transmit/receive unit (WTRU) comprising:
    circuitry configured to provide hybrid automatic repeat request (H-ARQ) processes for supporting transmission over an enhanced uplink (EU) channel;
    circuitry configured to receive configuration information, wherein the configuration information indicates which H-ARQ processes are associated with a particular dedicated channel medium access control (MAC-d) flow, wherein the association indicates that data from the particular MAC-d flow is allowed to be transmitted using an associated H-ARQ process;
    circuitry configured to provide, for a transmission time interval (TTI), data from the MAC-d flow for transmission using a first H-ARQ process, on a condition that the first H-ARQ process is from one of the associated H-ARQ processes; and
    circuitry configured to transmit data from the MAC-d flow over the EU channel using the first H-ARQ process.

8. The WTRU of claim 7 wherein configuration information is received for each MAC-d flow configured for the WTRU.

9. The WTRU of claim 7 wherein the configuration information is received via radio resource control (RRC) signaling.

10. The WTRU of claim 7 wherein the configuration information is received from a radio network controller (RNC).

11. The WTRU of claim 7 wherein the configuration information limits the H-ARQ processes associated with a MAC-d flow.

12. The WTRU of claim 7 wherein H-ARQ operation is synchronous between the WTRU and a Node-B.

* * * * *